April 15, 1924.
E. DESSAUER
ANTIFRICTION BEARING
Filed Nov. 24, 1920
1,490,804
3 Sheets-Sheet 1
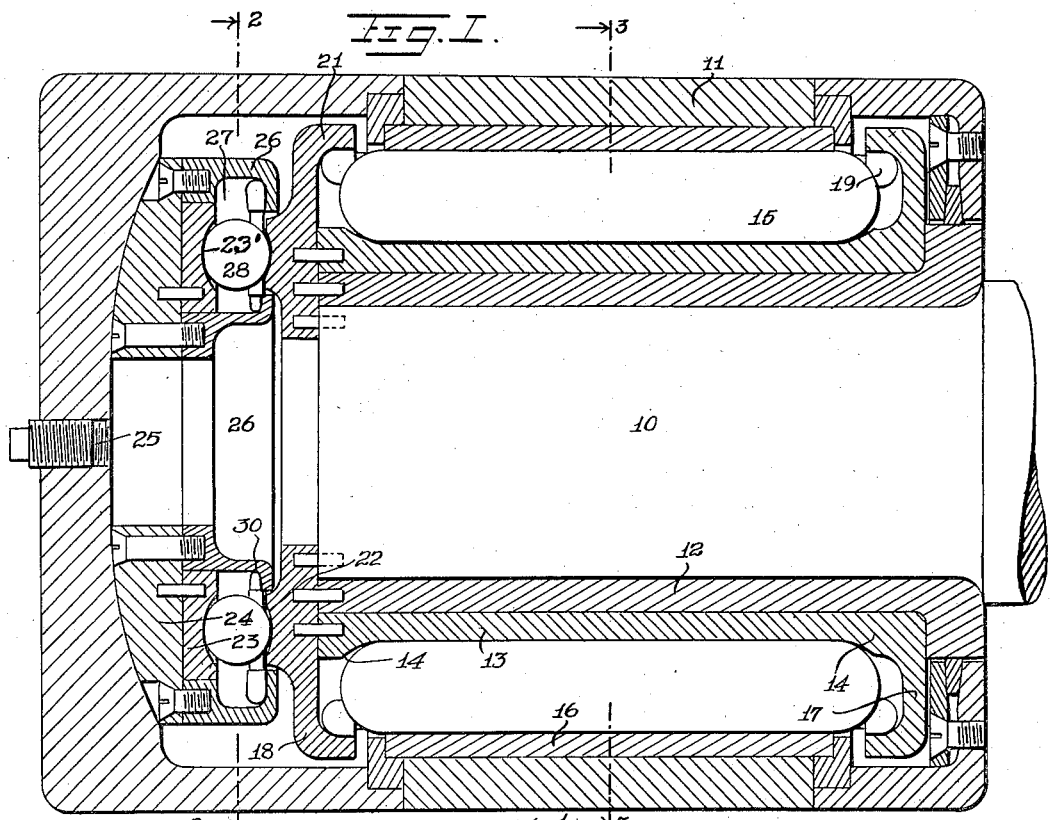

April 15, 1924. 1,490,804
E. DESSAUER
ANTIFRICTION BEARING
Filed Nov. 24, 1920  3 Sheets-Sheet 2
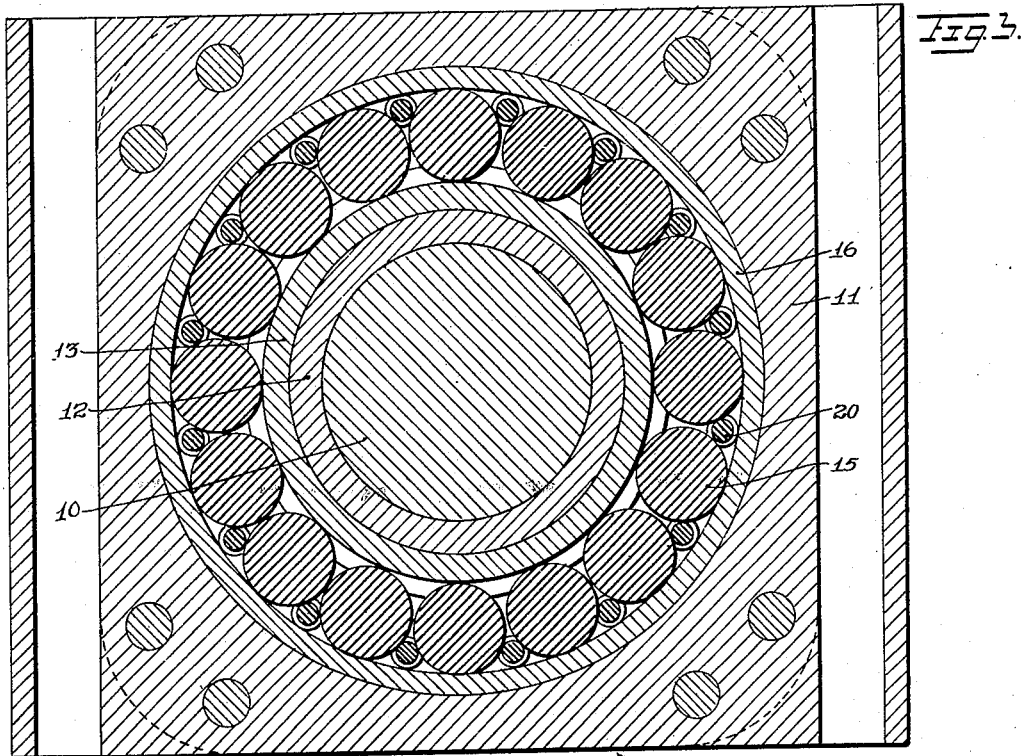
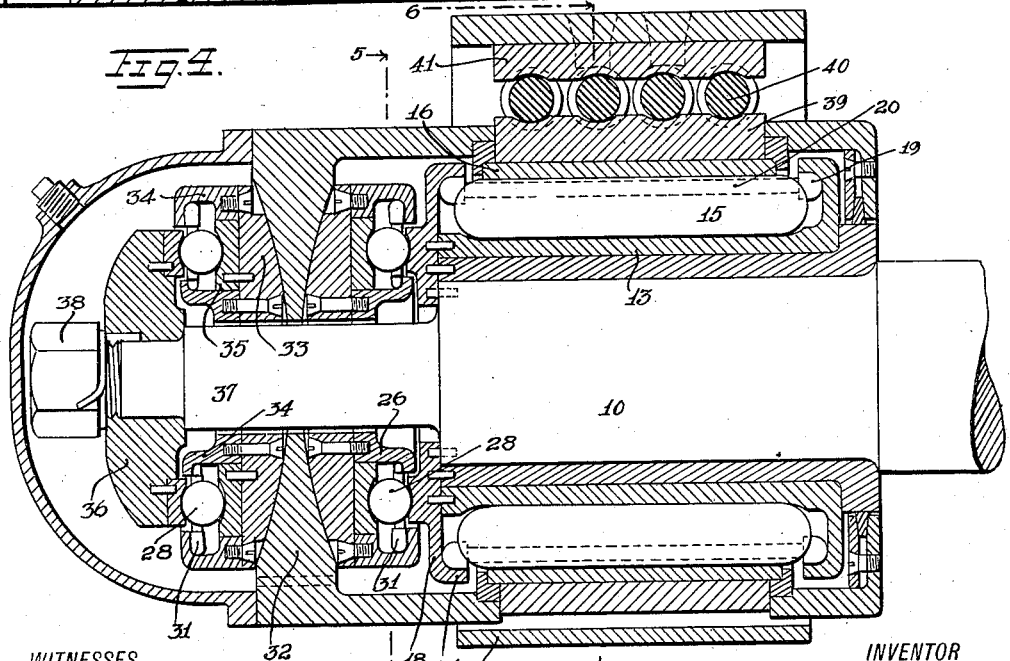
WITNESSES
H. T. Walker
J. H. Smoot
INVENTOR
E. Dessauer
BY Munn & Co.
ATTORNEYS April 15, 1924.
E. DESSAUER
ANTIFRICTION BEARING
Filed Nov. 24, 1920      3 Sheets-Sheet 3
1,490,804
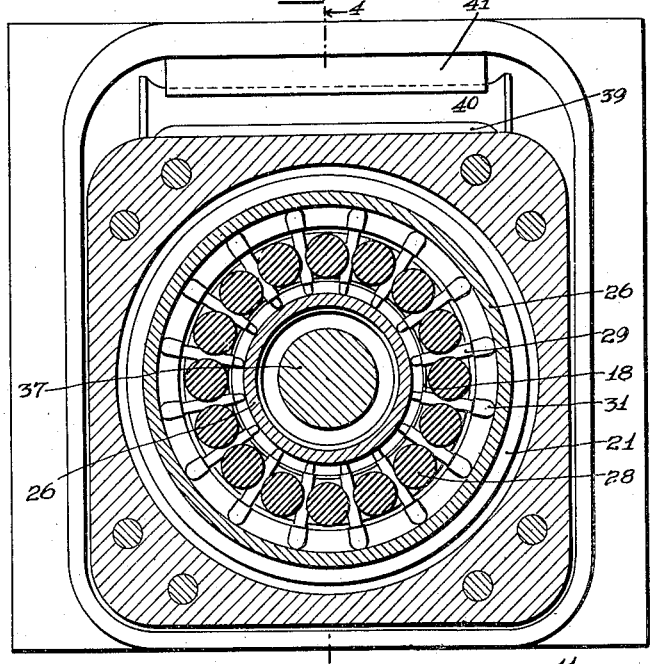
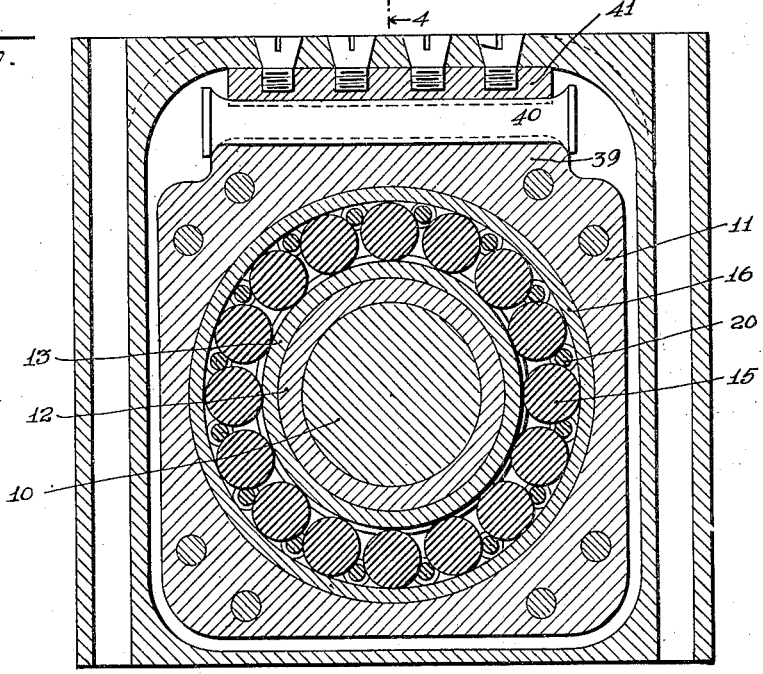
WITNESSES
H. T. Walker
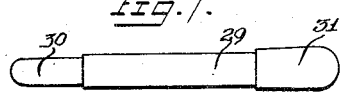
INVENTOR
E. Dessauer.
BY
ATTORNEYS Patented Apr. 15, 1924.

1,490,804

UNITED STATES PATENT OFFICE.

ERNEST DESSAUER, OF WEST CHESTER, PENNSYLVANIA.

ANTIFRICTION BEARING.

Application filed November 24, 1920. Serial No. 426,216.

*To all whom it may concern:*

Be it known that I, ERNEST DESSAUER, a citizen of the United States, and resident of West Chester, in the county of Chester and State of Pennsylvania, have invented a new and Improved Antifriction Bearing, of which the following is a full, clear, and exact description.

My invention relates to an anti-friction bearing, and aims to provide a device of this character, more particularly adapted for use in connection with railway rolling stock, although the same may be utilized to advantage in association with any number of different elements movable with respect to each other.

In connection with extremely heavy elements, which have been movable with respect to each other, such as are found in railway rolling stock, it is a well appreciated fact that considerable difficulty has been experienced in providing a suitable form of anti-friction bearing.

This difficulty is to be attributed mainly to the fact that a bearing provided for this purpose is to be of extremely heavy duty type, and to be capable of withstanding an unusual amount of strains and abuse.

It has also been difficult to provide a bearing capable of receiving a great amount of end thrust.

Having these defects in mind, I have constructed a bearing, which, as aforestated, although primarily intended for use in connection with extremely "heavy duty" might well be adapted for use in various connections, and which will be capable of receiving all of the weight incident to the supporting of one heavy body upon a supporting element, as well as permitting a movement of one of these elements with respect to the other with a minimum of friction.

A still further object of my invention is the provision of a bearing mounting which will serve to facilitate the absorption of strains incident to end thrusts.

Another object of my invention is the construction of a bearing of the nature set forth in the preceding paragraphs, which shall be extremely simple in construction, and readily capable of substitution for the conventional types of bearing now to be found upon rolling stock.

Further objects of my invention will appear in the annexed specification and drawings, which latter present practical embodiments of my invention, and in which—

Figure 1 is a sectional side view of a bearing constructed in accordance with my invention, and taken along the lines 1—1 of Figure 2 in the direction of the arrows.

Figure 2 is a sectional view taken along the line 2—2 of Figure 1.

Figure 3 is a further sectional view taken along the lines 3—3 of Figure 1.

Figure 4 illustrates a slightly different form of bearing than that illustrated in Figures 1, 2 and 3, and in the nature of a sectional view taken along the line 4—4 of Figure 5.

Figure 5 is a sectional view taken along the line 5—5 of Figure 4,

Figure 6 is a further sectional view taken along the line 6—6 of Figure 4, and

Figure 7 is a side view of one of the roller elements hereinafter described.

In these views the reference numeral 10 indicates the axle or shaft which is to be antifrictionally supported, and in turn supports a stationary element (not shown) to which the bearing box 11 is secured.

It will now be seen that a bushing 12 may conveniently encircle the axle 10, and is secured with respect thereto by any suitable expedient. A roller bed 13 provided with raised portions 14 adjacent its side edges in turn encircles the bushing 12, and an annular series of rollers 15 are arranged within the roller bed in which they are retained in applied position by a suitable retaining ring 16 affixed to the bearing box 11.

It is now to be noted that one end of the roller bed member 13 may be upturned, as has been indicated by the reference numeral 17, to provide a portion serving to limit any tendency towards longitudinal movement on the part of the rollers 15, and a flanged thrust plate or ring 18 affixed to the opposite side edges of the roller bed fulfills the same purpose at this edge of the unit thus formed.

It will be understood that practically every tendency on the part of the rollers 13 to move longitudinally will be counteracted by virtue of the raised portions 14, but with a view of further guarding against any tendency of this nature, and at the same time to provide a medium which will serve to retain the rollers in proper spaced relationship, subsidiary or supplemental rollers are provided. These latter include head portions 19 formed with a reduced body portion 20 extending between and connecting the heads 19.

By arranging the supplemental rollers in the manner specified, it will be noted that a spacing agent is provided, the body of which will virtually serve to accomplish this primary result. A longitudinal shifting of the rollers 15 is also precluded by this agent in that the heads 19 bear against the end portions of the rollers 15, and thus provide a retaining element, the subsidiary rollers being in turn retained in position by virtue of the engagement with the ring 16, and the inwardly turned edge 21 forming a continuation of each of the flanges 17, as well as the ring 18.

Thus an anti-friction element is provided which fulfills all of the purposes for which it is intended, in that it is capable of supporting a great amount of weight in such a manner that the latter will respond to a minimum amount of energy devoted towards moving it, aside from the fact that the parts will be properly spaced, and prevented from improper movement by reason of the functions exerted by the spacing and retaining elements.

Now with a view of providing the outer anti-friction element which shall be capable of receiving the usual amount of thrust, I provide ring 18 with an annular groove 22 and a ball race ring 23 provided with an annular groove 23' opposite groove 22 between which ball bearings 28 are positioned. Ball race ring 23 is secured to ring bed 24. The outer face of ring bed 24 is curved and lies against what might be termed the end portion of a stuffing box, the inner face of which is also curved for fittingly receiving the curved face of ring bed 24. It will be noted that by this expedient the automatic adjustment of the thrust bearing is insured in the event of a displacement of the axis of the axle 10. An opening 25 is provided at the end portion of bearing box 11 for the introduction of lubricant to the bearing.

A pair of flanged rings 26 spaced from each other and having their flange portions directed towards each other are conveniently secured adjacent the inner and outer edges of the bed ring 24, thus providing a partly enclosed channel 27. Balls 28 are now positioned within the channel 27, and bear against the first and second half portions 22 and 23 respectively of the ball race, thus providing a bearing member capable of receiving the end thrust of the main bearing.

With a view of suitably spacing each of the balls 28 forming a part of the annular series provided, supplemental rollers are utilized one of which is shown in detail in Figure 7.

It will be noted, reference being had to this figure, that the same includes a body portion 29 formed with one reduced, and one enlarged head portion 30 and 31 respectively. One of these latter rollers are interposed between each pair of the balls 28, as has clearly been shown in Figures 1 and 2, and it will be noted that the head portions of these elements bear respectively against the flanges of the rings 26 and seat in this position.

Thus the structure described in the preceding paragraph provides an efficient means for not alone receiving and absorbing end thrust shocks, but also provides means whereby the elements permitting the accomplishment of this result are properly retained at all times.

If a bearing is to be provided which is intended to receive a great amount of end thrusts, it will be seen, reference being had to Figures 4, 5 and 6, that this may be accomplished by primarily securing the bed ring 24 to an inwardly extending tapered flange 32, the taper of which preferably corresponds to the taper or curvature of the element with which the bed ring 24 of Figures 1, 2 and 3 is associated.

A second bed ring 33 mounting retaining rings 34, and one half of a ball race 35 is affixed to the opposite side of the flange 32, thus duplicating the parts found upon the inner face thereof.

It will also be noted, that with a view of providing a ball race section corresponding to the portion 22, permitting of the proper retention of the balls and rollers associated with the latter ball race, that a circular member 36 is affixed to the extended portion 37 of the shaft 10, and is retained in this position by any suitable type of lock nut 38. Thus an end thrust bearing is provided which has double the capacity and area of the end thrust bearing illustrated in Figures 1, 2 and 3. Obviously a variation of this nature is accordingly capable of accommodating an end thrust twice as great as that which the bearing illustrated in Figures 1 to 3 is capable of receiving, and thus the type of bearing illustrated in Figures 4 to 6 may be conveniently utilized where a great deal of end thrust is anticipated.

With a view of providing a further element which will serve to cushion an extreme end thrust, it will be noted, reference being had to Figures 4, 5 and 6, that the member 39 provided in lieu of the bearing box 11, is preferably formed with a series of longitudinally extending groove portions adapted to receive a series of rollers 40, a bearing member 41 mounting a retaining element 42 being provided for the purpose of affording means whereby the bearing may be attached to the element to be supported.

Obviously in this latter type of bearing a maximum amount of cushioning action will be exerted incident to the movable relationship permitted between the securing element 42, and the member 39, it being noted that by virtue of the groove construction provided that these members will at all times return to their proper positions one with respect to the other, incident to the tendency of the rollers 40 to seat within the body portions formed by the grooves provided in the faces of these members.

Thus I have provided a bearing which shall be capable of use in any number of different adaptions but which shall primarily present an end thrust device capable of supporting great loads, and which will further stand up under heavy end thrusts, Also these end thrusts may be materially cushioned and reduced by means of the construction described with reference to Figures 4 to 6.

Obviously numerous modifications of structure might readily be resorted to without in the least departing from the spirit of my invention, which I claim as;

1. In a bearing of the character described, a sleeve slidably surrounding an axle, an annular roller bearing bed provided with outwardly flared ends slidably surrounding said sleeve, a plurality of roller bearings arranged around said annular bearing bed, a bearing box sleeve surrounding said roller bearings, a ring arranged at the end and rotating with the axle, a thrust member carrying a grooved ring arranged at a spaced relation from said first mentioned ring, a plurality of ball bearings interposed between said rings, and spacing members arranged between adjacent ball bearings and one of said rings.

2. In a bearing, a pair of concentric sleeves spaced from each other, a plurality of rollers bearings enclosed by said sleeves, an end ring associated with one of said sleeves, a pair of flanged rings concentric to each other arranged adjacent said end ring, a ball race ring arranged opposite said end ring and spaced therefrom, a plurality of ball bearings arranged between said rings, and an end member interposed between said ball race ring and the end portion of the bearing box.

3. In an anti-friction ball bearing, the combination of an end thrust bearing and an anti-friction bearing, said end thrust bearing comprising a plurality of ball bearings circularly arranged at right angle to said anti-friction bearing, the end thrust member arranged adjacent said ball bearings, said end thrust member being curved at its outer end and fittingly engaging the end portion of the bearing box, whereby an automatic adjustment of said thrust bearing is obtained in the event that the same is caused to be displaced by undue strain.

4. In a ball bearing, the combination of a sleeve surrounding the end portion of an axle, a roller bearing sleeve surrounding said first mentioned sleeve, said roller bearing sleeve being provided with an outwardly flared flange and a shoulder on each end thereof, a plurality of roller bearings arranged around said roller bearing sleeve, a second roller bearing sleeve surrounding said roller bearings, said roller bearings having hemispherical ends and held in place by said curved shoulders, an end ring associated with one of said sleeves, and provided on its outer face with an annular groove, a roller bearing ring provided with an annular groove arranged opposite to and spaced from said end ring, a plurality of ball bearings interposed between said rings, and a plurality of revoluble spacing members arranged between the adjacent ball bearings for spacing the latter from each other.

5. In a bearing, concentrically arranged bearing members, one of which is movable with respect to the other, one of said bearing members being provided with an outwardly extending flange at one end thereof and a shoulder at each end, a flanged thrust plate at the opposite ends of said bearing members and a plurality of anti-friction rollers having engagement with said shoulders and interposed between said bearing members, adjacent ends of said rollers being partially enclosed by the flanges of said bearing member and said thrust plate.

ERNEST DESSAUER.